United States Patent [19]

Wolfe

[11] 4,153,572

[45] May 8, 1979

[54] ULTRAVIOLET EMITTING CEYMG ALUMINATE FLUORESCENT LAMP PHOSPHOR FOR PSORIASIS TREATMENT

[75] Inventor: Robert W. Wolfe, Wysox, Pa.

[73] Assignee: GTE Sylvania Incorporated, Stamford, Conn.

[21] Appl. No.: 915,495

[22] Filed: Jun. 14, 1978

[51] Int. Cl.² ............................................. C09K 11/46
[52] U.S. Cl. .............................. 252/301.4 R; 313/486
[58] Field of Search .................. 252/301.4 R; 313/486

[56] References Cited

U.S. PATENT DOCUMENTS

| 4,026,816 | 5/1977 | Ranby et al. | 252/301.4 R X |
| 4,088,922 | 5/1978 | Wolfe | 252/301.4 R X |

Primary Examiner—Jack Cooper
Attorney, Agent, or Firm—John C. Fox

[57] ABSTRACT

This invention relates to a CeYMg Aluminate fluorescent lamp phosphor which emits ultraviolet radiation in a preferred region of the electromagnetic spectrum proven useful for the treatment of psoriasis. The phosphor in fluorescent lamps shows improved performance for this application over other phosphors known to the art.

3 Claims, No Drawings

ULTRAVIOLET EMITTING CEYMG ALUMINATE FLUORESCENT LAMP PHOSPHOR FOR PSORIASIS TREATMENT

BACKGROUND OF THE INVENTION

This invention relates to a cerium yttrium magnesium aluminate fluorescent lamp phosphor possessing the hexagonal magneto plumbite structure and to fluorescent lamps incorporating the phosphor.

Philips Electronics and Associated Industries in British Pat. No. 1,452,083 disclosed an ultraviolet emitting fluorescent lamp phosphor having the composition $CeMgAl_{11}O_{19}$ and the magneto plumbite structure. H.F. Ward of Thorn Industries, in British Patent 1,194,014 disclosed a phosphor having the composition $CeAl_{11}O_{18}$ and the magnetoplumbite structure. Although $CeAl_{11}O_{18}$ and $CeMgAl_{11}O_{19}$ have similar crystal structures, incorporation of magnesium shifts the UV excited emission peak from about 460 nm in $CeAl_{11}O_{19}$ to about 370 nm in $CeMgAl_{11}O_{19}$. These phosphors are self-activated by the $Ce^{3+}$ ion.

SUMMARY OF THE INVENTION

It has been found that certain hexagonal magneto plumbite aluminate solid solutions of cerium yttrium magnesium aluminate composition show superior performance for use in fluorescent lamps used in the treatment of psoriasis. Phosphor compositions of this invention may be defined by the following formula:

$$Ce_xY_yMg_zAl_{11}O_{16.5+3/2(x+y)+z}$$

Where:
x may lie between 0.375 and 0.750
y may lie between 0.050 and 0.350
x + y less than or equal to 1.0
z may lie between 0.500 and 2.000
In accordance with a preferred embodiment,
x may lie between 0.550 and 0.750
y may lie between 0.050 and 0.250
z may lie between 0.500 and 1.500

The invention also includes fluorescent lamps incorporating the phosphor.

above description of some of the aspects of the invention.

Phosphors of this invention may be prepared easily by blending the required amounts of appropriate salts and firing in a reducing atmosphere at an elevated temperature for a modest time interval. Time, temperature, and reducing atmosphere are not critical, but a mixture of nitrogen and hydrogen or hydrogen are preferred, a temperature range from 1450° C. to 1750° C. is preferred, and a time interval from 1 to 5 hours is preferred. The particular salt of the metal ions to be used is not critical. Preferred salts are $Al(OH)_3$, MgO, $Y_2O_3$, and $CeO_2$ or $CeF_3$. The currently especially preferred composition has the approximate molar formula $$Ce_{0.60\pm.05}Y_{0.15\pm.05}Mg_{0.60\pm.15}Al_{11}O_{18.2\pm.3}$$

EXAMPLE

Preparation of $Ce_{.611}Y_{.150}Mg_{.611}Al_{11}O_{18.252}$ 10.516 grams of $CeO_2$, 2.500 grams of MgO, and 1.694 grams of $Y_2O_3$ are mixed with 87.46 grams of $Al(OH)_3$. The mixture is fired at 1550° C. for four hours in an atmosphere consisting of 75 volume percent $N_2$, 25 volume percent $H_2$. The resulting phosphor having the approximate molar composition $$Ce_{.611}Y_{.150}Mg_{.611}Al_{11}O_{18.252},$$

will consist essentially of hexagonal magneto plumbite phase. When the phosphor is fabricated into a 40 watt fluorescent lamp, the emission maximum will be 349 nanometers. The energy output after 100 hours operating time will be 94.3 percent of the initial energy output and the energy output will be distributed over the range 380 nanometers to below 320 nanometers as follows:

Watts output less than or equal to 320 nanometers —0.13

Watts output between 320 nanometers and 380 nanometers —7.4

Table 1 lists lamp data obtained with the phosphors of this invention compared to previous state of the art phosphors.

There are several points from the table that warrant discussion.

TABLE 1

LAMP DATA FROM 40 WATT FLUORESCENT LAMPS

| Source | Molar Composition | Emission Peak (nm) | Energy in Watts at 100 Hrs 320nm | Energy in Watts at 100 Hrs 320-380nm | Maintenance (%) 100 Hrs | Maintenance (%) 250 Hrs |
|---|---|---|---|---|---|---|
| Invention | $Ce_{.611}Y_{.150}Mg_{.611}Al_{11}O_{18.252}$ | 349 | .13 | 7.4 | 94.3 | 93.5 |
|  | $Ce_{.750}Y_{.250}Mg_{1.0}Al_{11}O_{19}$ | 353 | .11 | 6.9 | 92.2 | — |
| Standard Psoriasis Phosphor | $BaSi_2O_5:Pb$ | 352 | .18 | 7.2 | 72.3 | 63.8 |
| U.S. Pat. 4,088,922 | $Ce_{.611}Ba_{.20}Mg_{.611}Al_{11}O_{18.228}$ | 344 | .36 | 7.2 | 88.9 | 88.5 |
| " | $Ce_{.786}Ba_{.05}Mg_{.786}Al_{11}O_{18.515}$ | 348 | .20 | 6.7 | — | 87.9 |
| " | $Ce_{.611}Sr_{.2}Mg_{.611}Al_{11}O_{18.228}$ | 341 | .61 | 6.9 | — | 90.1 |
| " | $Ce_{.611}Ca_{.3}Mg_{.611}Al_{11}O_{18.328}$ | 338 | .57 | 5.6 | — | 90.4 |
| British Pat. 1,452,083 | $Ce_{1.0}Mg_{1.0}Al_{11}O_{19}$ | 365 | .06 | 4.2 | — | 88.2 |

DETAILED DESCRIPTION OF THE INVENTION

For a better understanding of the present invention, together with other and further objects, advantages and capabilities thereof, reference is made to the following disclosure and appended claims in connection with the First, the phosphor prepared according to this invention shows comparable or superior energy output in the 320 to 380 nanometers range after 100 hours operation relative to the currently used (standard) $BaSi_{108\ 2}O_5$: Pb phosphor. In addition, the energy output in the erythermal region (less than 320 nanometers) is significantly less than that produced by the standard phosphor. Finally, the maintenance of the phosphor according to this invention is much greater than standard. Thus, the output of the cerium yttrium magnesium aluminates will increase relative to that of the $BaSi_2O_5$: Pb with operating time. Furthermore, the need to adjust the time interval of exposure due to lamp aging will be a much less serious problem with phosphors of this invention compared to $BaSi_2O_5Pb$.

Second, the phosphor claimed in U.S. Pat. No. 4,088,922 shows a similarly improved performance over $BaSi_2O_5$: Pb. However, the material has higher energy output in the erythermal region and therefore is not as well suitable for use in psoriasis fluorescent lamps as phosphors of this invention.

Finally, while the CeMg Aluminate of British Patent No. 1,452,083 has low energy output in the erythermal region, it also has significantly lower output in the desired range of 320 to 380 nanometers and lower maintenance than the compositions of the invention.

While there has been shown and described what are at present considered the preferred embodiments of the invention, it will be obvious to those skilled in the art that various changes and modifications may be made therein without departing from the scope of the invention as defined by the appended claims.

What is claimed is:

1. Cerium yttrium magnesium aluminate phosphor exhibiting a hexagonal magneto plumbite structure and having the molar formula of $$Ce_xY_yMg_zAl_{11}O_{16.5 + 3/2(x+y)+z}$$

where x is within the range 0.375 and 0.750, y is within the range of 0.050 and 0.350 and z is within the range 0.500 and 2.000, and where the sum of x and y are equal to or less than 1.0.

2. The cerium yttrium magnesium aluminate phosphor of claim 1 where x is within the range of 0.550 and 0.750, y is within the range 0.050 and 0.250 and z is within the range 0.500 and 1.500.

3. The cerium magnesium aluminate phosphor of claim 2 having a molar formula of approximately $$Ce_{0.60\pm0.5}\,Y_{0.15\pm.05}\,Mg_{0.60\pm.15}\,Al_{11}O_{18.2\pm.3}\,-.$$

* * * * *

UNITED STATES PATENT OFFICE
CERTIFICATE OF CORRECTION

PATENT NO. : 4,153,572
DATED : May 8, 1979
INVENTOR(S) : ROBERT W. WOLFE

It is certified that error appears in the above–identified patent and that said Letters Patent are hereby corrected as shown below:

Col. 2, line 66 - After "(standard), please delete
-- $BaSi_{108}$ $2O_5$ -- and insert
-- $BaSi_2O_5$:Pb --.

*Signed and Sealed this*

*First* Day of *July 1980*

[SEAL]

Attest:

SIDNEY A. DIAMOND

*Attesting Officer*  *Commissioner of Patents and Trademarks*